United States Patent [19]

Yamazaki et al.

[11] Patent Number: 6,022,518
[45] Date of Patent: Feb. 8, 2000

[54] SURFACE GRAPHITIZED CARBON MATERIAL AND PROCESS FOR PRODUCING THE SAME

[75] Inventors: Yoshinori Yamazaki; Hiroshi Ejiri, both of Kamisu-machi, Japan

[73] Assignee: Petoca, Ltd., Tokyo, Japan

[21] Appl. No.: 08/937,662

[22] Filed: Sep. 24, 1997

[30] Foreign Application Priority Data

Sep. 24, 1996 [JP] Japan .................................. 8-271322

[51] Int. Cl.⁷ .................................................. C01B 31/04
[52] U.S. Cl. .................. 423/448; 423/445 R; 429/231.8
[58] Field of Search ......................... 429/231.8; 423/448, 423/445 R; 428/408; 252/502

[56] References Cited

U.S. PATENT DOCUMENTS

| | | | |
|---|---|---|---|
| 4,201,777 | 5/1980 | Inoue ........................................ | 428/212 |
| 4,774,147 | 9/1988 | Kuse et al. ................................ | 428/343 |
| 5,244,757 | 9/1993 | Takami et al. ............................ | 429/194 |
| 5,356,574 | 10/1994 | Tamaki et al. ............................ | 264/29.2 |
| 5,597,611 | 1/1997 | Lennox et al. ............................ | 427/113 |
| 5,753,387 | 5/1998 | Takami et al. ............................ | 429/194 |

FOREIGN PATENT DOCUMENTS

| | | |
|---|---|---|
| 0 555 080 | 8/1993 | European Pat. Off. . |
| 0 675 555 | 10/1995 | European Pat. Off. . |

OTHER PUBLICATIONS

Patent Abstracts of Japan, JP 1–221859, Sep. 5, 1989.
Patent Abstracts of Japan, JP 3–129664, Jun. 3, 1991.
Patent Abstracts of Japan JP 5–283061, Oct. 29, 1993.
Patent Abstracts of Japan, JP 6–111818, Apr. 22, 1994.
Patent Abstracts of Japan, JP 6–150931, May 31, 1994.
Patent Abstracts of Japan, 07085862, Mar. 31, 1995.
Patent Abstracts of Japan, 07161347, Jun. 23, 1995.
Patent Abstracts of Japan, 07192724, Jul. 28, 1995.
Patent Abstracts of Japan, 07335263, Dec. 22, 1995.
Patent Abstracts of Japan, 08069798, Mar. 12, 1996.
Patent Abstracts of Japan, 09063584, Mar. 7, 1997.
Patent Abstracts of Japan, 09063585, Mar. 7, 1997.
Patent Abstracts of Japan, 06333559, Dec. 2, 1994.
Patent Abstracts of Japan, 61132600, Jun. 20, 1996.

*Primary Examiner*—Maria Nuzzolillo
*Assistant Examiner*—Jonathan Crepeau
*Attorney, Agent, or Firm*—Oblon, Spivak, McClelland, Maier & Neustadt, P.C.

[57] ABSTRACT

A surface graphitized carbon material comprising a graphitic surface and a carbonaceous internal part. This surface graphitized carbon material can be produced by contacting a carbon material with a metal having catalytically graphitizing activity or a compound thereof to thereby cause the metal or compound thereof to be present in a surface of the carbon material and heating the carbon material at 300 to 1500° C. in an inert atmosphere. By virtue of the possession of a graphitic surface and a carbonaceous internal part, the surface graphitized carbon material of the present invention simultaneously has the properties of the carbon material such that, when used in a negative electrode for lithium-ion secondary battery, a negative electrode having high charge and discharge capacities, being excellent in performance at low temperature, and facilitating a display of residual capacity can be obtained, and the properties of the graphite material such that a negative electrode whose cycle deterioration of charge and discharge capacities is slight can be obtained.

7 Claims, No Drawings

SURFACE GRAPHITIZED CARBON MATERIAL AND PROCESS FOR PRODUCING THE SAME

FIELD OF THE INVENTION

The present invention relates to a novel carbon material, process for producing the same and a negative electrode for lithium-ion secondary battery using the carbon material. More particularly, this invention is concerned with a surface graphitized carbon material which enables production of a negative electrode for a lithium-ion secondary battery exhibiting large charge and discharge capacities, being excellent in low temperature performance, facilitating a display of residual capacity, and being free from a cycle deterioration of charge and discharge capacities, and is further concerned with a process for producing the surface graphitized carbon material and a negative electrode for a lithium-ion secondary battery using the same.

BACKGROUND OF THE INVENTION

In accordance with the miniaturization of, for example, electronic equipment such as a portable telephone or a notebook-sized personal computer, the demand for further miniaturization and weight reduction of a secondary battery as a power source thereof is increasing year after year, and the enhancement of the performance of the secondary battery is also being demanded. In particular, the secondary battery in which an alkali metal, especially lithium, is used as an active material of a negative electrode has generally various advantages. For example, it not only ensures high energy density and high electromotive force, but also has wide operating temperature range due to the use of a nonaqueous electrolyte. Further, the secondary battery is excellent in shelf life, miniaturized and lightweight.

However, when metallic lithium is used in a negative electrode for lithium-ion secondary battery, the problem has been encountered such that the repetition of charge and discharge of the secondary battery occasionally causes formation of dendrites on the surface of the metallic lithium and the growth of dendrites causes the piercing of the separator disposed between the positive and negative electrodes so that the dendrites contact the positive electrode to thereby invite a short-circuit.

In recent years, it has been demonstrated that the above formation of dendrites can be prevented by using a carbon based material (carbon material or graphite material) in which lithium ions are occluded for the negative electrode. Thus, energetic studies are being made on the carbon based material as the most promising material for the negative electrode of secondary battery.

The carbon based material is generally classified into the carbon material and the graphite material, depending on the level of growth of graphite texture.

The carbon materials having been employed as a material of a negative electrode for a lithium-ion secondary battery include not only natural materials such as coal, but also coal-based carbon materials such as coke, polymeric compound-based carbon fibers such as polyacrylonitrile (PAN)-based carbon fiber, pitch-based carbon fibers which are not graphitized, and pitch-based spherical carbon materials. These carbon materials are each composed mainly of amorphous carbon, contain small graphite crystallites, and have a disorderly crystal arrangement, so that a negative electrode having larger charge and discharge capacities than those of the graphite materials can occasionally be obtained, depending on sintering temperature. Further, the lithium-ion secondary battery including the above negative electrode exhibits a slow potential change upon completion of discharge, so that the residual capacity can be displayed on the basis of this potential change. Still further, the above negative electrode is characterized by having excellent properties at low temperature as compared with those of the negative electrodes based on graphitic materials.

However, the use of the negative electrode based on the above carbon material in the secondary battery involves the problem that the charge and discharge capacities are gravely lowered by the repetition of charge and discharge cycles.

On the other hand, with respect to the graphite material, the use of artificial materials such as artificial graphite and graphite fiber and spherical graphite material obtained by graphitizing the above carbon fiber and spherical carbon material, respectively, has been proposed in addition to the natural material such as natural graphite.

In these graphite materials, the graphite crystallites grow large, the crystal arrangement has little disorder and it is believed that a lithium atom is orderly intercalated between crystallites in a lithium atom to carbon atom proportion of 1:6. The negative electrode for a lithium-ion secondary battery which is based on the above graphite material is advantageous in that the change of charge and discharge capacities by the repetition of charge and discharge cycles is slight.

The theoretical capacity based on the above lithium atom occlusion arrangement is 372 mAh/g for the negative electrode for a lithium-ion secondary battery which is based on the graphite material. However, the real capacity of the negative electrode based on the conventional graphite material has not reached this theoretical capacity and it has been difficult to realize the charge and discharge capacities which are comparable to those exhibited in the use of the carbon material.

Moreover, the negative electrode based on the graphite material involves the problem that the potential change is sharp at the termination of charge and discharge to thereby render a display of residual capacity difficult.

Various studies and investigations have been made with a view toward development of a carbon-based material for a negative electrode for secondary battery combining the properties of the carbon material such that, when used in a negative electrode for a secondary lithium battery, the charge and discharge capacities are large, excellent low temperature performance is ensured, and residual capacity can be displayed, with the properties of the graphite material such that the cycle deterioration of charge and discharge capacities is slight.

For example, Japanese Patent Laid-Open Publication No. 1(1989)-221859 proposed heating pulverized coke in an inert gas stream or in vacuum at a temperature at which no graphitization occurs. However, the inventors have studied the above heating of pulverized coke in an inert gas stream or in vacuum and have found that, although the heating must be conducted at a relatively high temperature for attaining a substantial improvement in cycle deterioration, the high capacity characteristics per se inherently possessed by the carbon material are gravely deteriorated thereby.

Japanese Patent Laid-Open Publication No. 7(1995)-335263 proposed a process comprising preparing a paste from graphite powder coated with a metal such as Ni or Cu, coating a metal plate of, for example, titanium with this paste and drying to thereby obtain a negative electrode for a secondary lithium battery in order to control the capacity deterioration. However, the addition of a metal to graphite powder for attaining an improvement in capacity cycle deterioration involves the problem that the weight of the negative electrode increases to thereby cause a grave decrease of the battery capacity per weight and, thus, renders its practicability poor.

Negative electrodes for secondary lithium batteries containing milled graphite fibers which are prepared by spinning a mesophase pitch, optionally lightly carbonizing the resultant pitch fiber, milling the pitch fiber, and carbonizing and graphitizing the milled pitch fibers, are disclosed in Japanese Patent Laid-Open Publication Nos. 7(1995)-85862, 8(1996)-69798, 9(1997)-63584 and 9(1997)-63585. These negative electrodes have such properties that the charge and discharge can be performed at high current density, the charge and discharge capacities are high and the electrolyte is scarcely decomposed at the time of charge and discharge. However, when the above milled graphite fibers are used singly, the potential change is sharp at the termination of charge and discharge and a negative electrode having charge and discharge capacities which are equal to or greater than those exhibited in the use of the carbon material has not yet been realized.

Thus, mixings of carbon materials, graphite materials and carbon materials with graphite materials have been investigated and studied in order to compensate each other's drawbacks.

For example, Japanese Patent Laid-Open Publication No. 6(1994)-111818 discloses that an electrode sheet (negative electrode) obtained by mixing spherical graphite particles with short graphitized carbon fibers (obtained by graphitizing carbon fiber grown in the vapor phase) in an appropriate proportion exhibits an enhanced conductivity to thereby enable realizing a high capacity and also exhibits an enhanced electrode strength and enables preventing carbon material falling and falling from a collector base with the result that the cycle life can be prolonged. However, it has been found that the discharge capacity is decreased and the mixing effect is unsatisfactory, depending on conditions.

Japanese Patent Laid-Open Publication No. 5(1993)-283061 discloses that a combination use of carbon particles with carbon fiber in a negative electrode makes the conductivity increased and realizes a bulky structure to thereby increase the diffusion of electrolyte through pores, so that a secondary lithium battery which is excellent in charge and discharge velocities, output density, and cycle characteristics can be obtained. However, it has been found that the discharge capacity is unsatisfactorily as small as 270 mAh/g.

Japanese Patent Laid-Open Publication No. 3(1991)-129664 discloses the use in a negative electrode of a composite material comprising fine fibrous graphite and, borne between fibers thereof, a carbonaceous material made from organic polymeric material enables increasing the packing density of the electrode, improving the voltage flatness at discharge or the charge and discharge cycle characteristics, and increasing the energy density. However, it has been found that the initial charge and discharge efficiency is as low as 67% and that the amount of lithium inactivated at the first cycle is large, thereby to render its practicability poor.

Japanese Patent Laid-Open Publication No. 6(1994)-150931 discloses a process comprising mixing an amorphous particulate graphite material with a carbon material of pitch-based carbon fiber in an attempt to enhance the conductivity which is a drawback of the carbon material, increase the charge and discharge velocities which are a drawback of the graphite material, and improve the cycle characteristics. However, the discharge capacity is still as small as about 200 mAh/g.

Japanese Patent Laid-Open Publication No. 7(1995)-161347 discloses a process comprising mixing in equal amounts a highly crystalline PAN-based carbon fiber with low resistivity which has been carbonized at high temperature with a lowly crystalline PAN-based carbon fiber with high resistivity which has been carbonized at low temperature to thereby compensate each other's drawbacks and realize a negative electrode material having a large discharge capacity and exhibiting a low initial capacity loss. However, it has been found that the initial discharge capacity is still as low as about 240 mAh/g and the initial charge and discharge efficiency is still as low as about 55%, so that the obtained material cannot serve practical use.

Japanese Patent Laid-Open Publication No. 7(1995)-192724 discloses that a composite (mixture) of a natural or synthetic powdery graphite with a powdery carbon material such as a carbon material whose graphitization is difficult and/or a carbon material whose graphitization is easy has both of the high true density of graphite and the capability of diffusing lithium ions at high velocity of the carbon material and has such characteristics that the charge and discharge performance is high and the stability of positive electrode is not deteriorated. However, the powdery graphite used as a negative electrode material therein is natural graphite or an artificial graphite obtained by carbonizing an organic material and heating the carbonization product at high temperature, and a battery performance as negative electrode material in the composite of the above graphite with the powdery carbon material is exhibited by a special operation of intermittent charge and discharge which is not a common technique.

The inventors have made various investigations and studies with the intent to solve the above problems of the prior art. As a result, it has been found that a novel carbon material comprising a carbonaceous internal part and a graphitized surface can be prepared by heating a carbon material in the presence of a specified metal compound at specified temperature and that the use of this carbon material as a negative electrode enables obtaining a secondary battery exhibiting large charge and discharge capacities, being excellent in low temperature performance, facilitating a display of residual capacity, and ensuring excellent cycle characteristics of charge and discharge capacities. The present invention has been completed on the basis of the above findings.

OBJECT OF THE INVENTION

It is an object of the present invention to provide a carbon material which, when used in a negative electrode for lithium-ion secondary battery, simultaneously has the properties of the carbon material such that the charge and discharge capacities are large, excellent low temperature performance is ensured and residual capacity can be displayed and the properties of the graphite material such that the cycle deterioration of charge and discharge capacities is slight and, therefore, is suitable for use in a negative electrode of secondary battery. It is another object of the present invention to provide a process for producing the carbon material, and a negative electrode for a lithium-ion secondary battery using the above carbon material.

SUMMARY OF THE INVENTION

The surface graphitized carbon material of the present invention comprises a graphitic surface and a carbonaceous internal part.

With respect to the surface graphitized carbon material of the present invention having the above structure, when Raman spectrum light intensities of a surface part are measured by laser Raman spectroscopy, a ratio ($I_{1480}/I_{1600}$) of an intensity $I_{1480}$ of a trough appearing near 1480 cm$^{-1}$ to an intensity $I_{1600}$ of a peak appearing near 1600 cm$^{-1}$ is 0.45 or less, particularly 0.41 or less. The surface graphitized carbon material exhibits the same analytical X-ray diffraction pattern as that of the conventional carbon material having its surface not graphitized.

Although the surface graphitized carbon material of the present invention is not particularly limited with respect to the starting material, configuration, size, etc., as long as it has the above structure, it is preferred that the surface graphitized carbon material be in the form of milled pitch-based carbon fibers having a surface graphitized.

The process for producing a surface graphitized carbon material according to the present invention comprises the steps of:

contacting a carbon material with a metal having catalytically graphitizing activity or a metal compound thereof to thereby cause the metal or compound thereof to be present on a surface of the carbon material, and heating the carbon material at 300 to 1500° C. in an inert atmosphere to thereby prepare a surface graphitized carbon material comprising a graphitic surface and a carbonaceous internal part.

In the process of the present invention, it is preferred that the carbon material be prepared by carbonizing an organic material as a carbon source at 400 to 1500° C. Further, in the process of the present invention, it is preferred that milled pitch-based carbon fibers prepared by carbonizing a pitch fiber and milling the carbonized pitch fiber be used as the carbon material in the surface graphitization.

The negative electrode for use in a lithium-ion secondary battery according to the present invention comprises the above surface graphitized carbon material.

DETAILED DESCRIPTION OF THE INVENTION

The surface graphitized carbon material of the present invention comprises a graphitic surface and a carbonaceous internal part.

The terminology "carbonaceous" used herein means being a carbon based material which has a texture of carbon material composed mainly of amorphous carbon, containing small graphite crystallites and having a disorderly crystal arrangement. The terminology "graphitic" used herein means being a carbon based material having a texture of graphite material in which graphite crystallites grow large and disorder of the crystal arrangement is slight.

With respect to the surface graphitized carbon material of the present invention having the above structure, when Raman spectrum light intensities of a surface part are measured by laser Raman spectroscopy in which Ar ion laser (514.5 nm in wavelength) is used as a light source, a ratio ($I_{1480}/I_{1600}$) of an intensity $I_{1480}$ of a trough appearing near 1480 cm$^{-1}$ to an intensity $I_{1600}$ of a peak appearing near 1600 cm$^{-1}$, is 0.45 or less, particularly 0.41 or less. These values are similar to those of the graphite material.

Generally, when the Raman spectrum of a carbon-based material is measured by laser Raman spectroscopy, two Raman bands (light intensity peaks) are observed near 1600 cm$^{-1}$ and 1350 cm$^{-1}$. The following changes simultaneously advance in accordance with the progress of graphitization of the carbon material:

(1) the band near 1600 cm$^{-1}$ shifts to a low wave number side, (2) the intensity of the band near 1350 cm$^{-1}$ is lowered, and (3) the widths of the two bands are gradually decreased and the intensity of the part of trough (trough of light intensity: near 1480 cm$^{-1}$) between the two bands is lowered.

However, in the surface graphitized carbon material of the present invention having a carbonaceous internal part with a disorderly crystal texture, the change (3) above predominantly occurs in accordance with the graphitization of the surface part, so that the light intensity ratio ($I_{1480}/I_{1600}$) of an intensity $I_{1480}$ of a trough appearing near 1480 cm$^{-1}$ and an intensity $I_{1600}$ of a peak appearing near 1600 cm$^{-1}$ falls in the above specified range of values.

The lower the light intensity ratio of $I_{1480}/I_{1600}$, the more extensively the degree of graphitization is advanced. The light intensity ratio of the surface graphitized carbon material of the present invention is apparently lower than that of the conventional carbon material, so that the advance of the degree of graphitization of the surface is recognized.

The surface graphitized carbon material of the present invention having the above surface has its internal part held carbonaceous, so that it exhibits the same analytical X-ray diffraction pattern as that of the conventional carbon material having its surface not graphitized.

A depth of the boundary between the graphitized (graphitic) surface part and the non-graphitized (carbonaceous) inner part in the surface-graphitized carbon material of the present invention can be confirmed by conducting the above-mentioned measurement using laser Raman spectroscopy in a depth direction, because the inner part of the surface-graphitized carbon materials shows approximately the same intensity ratio ($I_{1480}/I_{1600}$) as that of the conventional carbonaceous materials.

With respect to the conventional carbon material having its surface not graphitized, the above light intensity ratio of $I_{1480}/I_{1600}$ exhibited when Raman spectrum light intensities of a surface part are measured by laser Raman spectroscopy range from 0.48 to 0.80, and the inter-layer spacing of the graphite layers led from the X-ray diffraction is not less than 3.460 Å.

Moreover, with respect to the conventional graphite material having its internal part also graphitized, the above light intensity ratio of $I_{1480}/I_{1600}$ exhibited when Raman spectrum light intensities of a surface part are measured by laser Raman spectroscopy is 0.45 or less, and the inter-layer spacing of the graphite layers led from the X-ray diffraction ranges from 3.425 to 3.354 Å.

The surface graphitized carbon material of the present invention is not particularly limited with respect to the starting material, configuration, size, etc., as long as it has the above structure.

Thus, the surface graphitized carbon material of the present invention may be in, for example, particulate, fibrous, paper, nonwoven fabric resembling, filmy, or spherical (like mesocarbon microbeads) form.

However, the surface graphitized carbon material is preferred to be particulate or fibrous, especially, in the form of milled fibers from the viewpoint that the surface through which lithium ions can make their entrance and exit is enlarged to thereby increase the charge and discharge velocities. The terminology "milled fibers" used herein means cut fibers of not greater than 1 mm in length.

In the present invention, when the surface graphitized carbon material is a milled fibrous material, namely, milled surface graphitized carbon fibers, it is preferred that the average particle size thereof range from 10 to 50 μm, especially, 10 to 25 μm. This average particle size can be calculated from the particle size distribution determined by the laser diffractometry.

The milled surface graphitized carbon fibers are preferred to have an aspect ratio (ratio of length to diameter of fiber) ranging from 1 to 30, especially, from 1 to 20. This aspect ratio is an average of measurements of 100 extracted samples of obtained milled carbon fibers.

The surface graphitized carbon material of the present invention can be produced by subjecting any of carbon materials including pitch-based, coke-based and synthetic resin-based carbon materials, for example, pitch-based carbon fibers, PAN-based carbon fibers and the like to graphitization of their surfaces, particularly, a specified surface graphitization which will be described later.

In particular, the pitch-based carbon fiber is preferred because mass production thereof can be conducted at low cost and because milled surface graphitized carbon fibers having the above average particle size and aspect ratio can easily be prepared from the milled carbon fibers obtained by milling the pitch-based carbon fiber.

The starting material of the pitch-based carbon fiber may be any of petroleum pitches, coal pitches and synthetic pitches. A starting material containing mesophase pitch is preferred because the surface is provided with desired graphite layer structure easily. A 100% mesophase pitch is especially preferred.

The above surface graphitized carbon material of the present invention has a peculiar structure such that the graphitization has been promoted only at the surface part thereof while maintaining the same texture as that of the carbon material at its internal part. Therefore, when used in a negative electrode for lithium-ion secondary battery, the surface graphitized carbon material of the present invention simultaneously has the properties of the carbon material such that, when used in a negative electrode for lithium-ion secondary battery, a negative electrode having high charge and discharge capacities, being excellent in low temperature performance, and facilitating a display of residual capacity can be obtained and the properties of the graphite material such that a negative electrode whose cycle deterioration of charge and discharge capacities is slight can be obtained.

The process of the present invention for producing the surface graphitized carbon material will be described in detail below.

The process of the present invention for producing the surface graphitized carbon material comprises the steps of contacting a carbon material with a metal having catalytically graphitizing activity or a compound thereof to thereby cause the metal or metal compound thereof to be present on a surface of the carbon material, and subjecting the carbon material to a surface graphitization at specified temperature in an inert atmosphere to thereby prepare a surface graphitized carbon material comprising a graphitic surface and a carbonaceous internal part.

In the process of the present invention, the carbon material for use in the surface graphitization is not particularly limited with respect to the starting material, configuration, size, etc.

Thus, for example, the configuration of the carbon material may be, for example, particulate, fibrous, paper, nonwoven fabric resembling, filmy, or spherical like mesocarbon microbeads.

However, the configuration of the carbon material is substantially completely kept in the surface graphitized carbon material obtained by the surface graphitization, so that the carbon material is preferred to be particulate or fibrous, especially in the form of milled fibers, from the viewpoint that the surface of the obtained surface graphitized carbon material through which lithium ions can make their entrance and exit is enlarged to thereby increase the charge and discharge velocities in the use in a negative electrode for a secondary battery.

The carbon material for use in the surface graphitization in the process of the present invention is not particularly limited as long as it has a carbonaceous texture capable of occluding lithium, and any of the carbon materials having been employed in negative electrodes for secondary lithium batteries may be used. Examples of such carbon materials include pitch-based, coke-based, and synthetic resin-based materials, such as PAN-based carbon fibers and pitch-based carbon fibers.

In particular, the pitch-based carbon fiber is preferred because mass production thereof can be conducted at low cost and because milled carbon fibers having the above average particle size and aspect ratio can easily be prepared from the milled carbon fibers obtained by milling the pitch-based carbon fiber.

The process for producing the pitch-based carbon fiber preferred as the carbon material will be described in detail below.

The pitch-based carbon fiber suitably employed in the process of the present invention can be prepared by spinning pitch to thereby obtain a pitch fiber, infusibilizing the pitch fiber and carbonizing the infusibilized fiber at relatively low temperature.

The starting pitch employed in the carbonization may be any of petroleum pitches, coal pitches, and synthetic pitches. A pitch containing mesophase pitch is preferred because it can be infusibilized at a high rate and because, at the surface graphitization, the surface can be provided with desired graphite layer structure. A 100% mesophase pitch is especially preferred.

The viscosity of the starting pitch is not particularly limited as long as the pitch is spinnable. However, a pitch whose softening point is low can advantageously be employed from the viewpoint of production cost and stability. For example, it is preferred that the starting pitch have a softening point ranging from 230 to 350° C., especially, from 250 to 310° C.

The method of spinning the above starting pitch is not particularly limited. For example, use can be made of various techniques such as melt spinning, melt blow, centrifugal spinning and vortex spinning techniques. Of these, the melt blow technique is especially preferred.

In the melt blow technique, a starting pitch having a viscosity as low as not greater than tens of poises is spun while being blown to cut at a high speed and rapidly cooled. Therefore, not only is the productivity of pitch fiber high but also the pitch fiber is provided with a fibrous configuration suitable for producing milled fibers having desired aspect ratio. Further, spinning of a mesophase pitch by the melt blow technique is advantageous in that graphite layer planes are arranged in parallel to the fiber axis by the graphitization, so that a surface facilitating the occlusion of lithium ions can be formed.

In this melt blow technique, each spinning orifice generally has a diameter ranging from 0.1 to 0.5 mm, preferably, from 0.15 to 0.3 mm.

Further, the spinning speed is preferred to be at least 500 m/min, especially, at least 1500 m/min and, still especially, at least 2000 m/min.

Although being slightly varied depending on the employed starting pitch, the spinning temperature generally ranges from 300 to 400° C. and, preferably, from 300 to 380° C.

The thus obtained pitch fiber is infusibilized by common methods. In the infusibilization of the pitch fiber, use can be made of various methods, for example, the method in which the fiber is heated in an oxidative gas atmosphere of nitrogen dioxide, oxygen, or the like, the method in which the fiber is treated in an oxidative aqueous solution of nitric acid, chromic acid, or the like, and the method in which the fiber is subjected to polymerization treatment using light or gamma rays.

A simple method of infusibilizing the fiber comprises heating the fiber in the air. Although slightly varied depending on the type of the fiber, the heating can be conducted by raising the temperature to about 350° C. at an average heating rate of at least 3° C./min, preferably, at least 5° C./min.

The pitch-based carbon fiber can be prepared by carbonizing the thus obtained infusibilized pitch fiber at relatively low temperatures of 400 to 1500° C., preferably, 500 to 1000° C. in an inert gas atmosphere. In the case where the pitch-based carbon fiber is milled, it is advantageous that the carbonization be conducted at 500 to 900° C. from the viewpoint that longitudinal cracking of fiber by milling can be prevented.

When the carbonization temperature is lower than 400° C., execution of the surface graphitization described later is accompanied by facilitation of the graphitization of the carbon material owing to the metal with catalytic activity or to the metal compound thereof with the result that the graphite texture is likely to grow at not only the surface part but also the internal part to thereby disenable full exertion of the characteristics of the carbon material such that the initial discharge capacity is large, display of a residual capacity of battery is easy, and the low temperature properties are superior to those of the graphite material.

On the other hand, when the carbonization temperature exceeds 1500° C., there is the danger that the graphitization advances throughout the carbon fiber in this stage, so that the property of high charge capacity of the carbon material is deteriorated, thereby disenabling meeting the object of the present invention.

Although the thus obtained pitch-based carbon fiber may directly be subjected to the surface graphitization described later, it is preferably milled prior to the surface graphitization.

Effective production of milled carbon fibers suitable for use in the present invention can be effected by the use of, for example, a device in which a rotor equipped with a plate is revolved at a high speed to thereby cut the fibers in the direction perpendicular to the fiber axis, such as the Victory mill, jet mill, or cross flow mill.

In the above milling, the length of milled fibers can be controlled by regulating the rotating speed of the rotor, the angle of the plate, the size of porosity of a filter attached to the periphery of the rotor, etc.

The use of the Henschel mixer, ball mill, or crusher can be considered for milling the pitch-based carbon fiber. However, this milling cannot be stated to be appropriate because not only does pressure apply to the fibers in the direction at right angles to the fibers to thereby increase the probability of longitudinal cracks along the fiber axis but also the milling takes a prolonged period of time.

The thus obtained milled pitch-based carbon fibers preferably have an average particle size of 10 to 50 $\mu$m and an aspect ratio of 1 to 30, especially, 1 to 20. These average particle sizes and aspect ratios are maintained in the surface graphitized carbon fibers as a final product.

In the process of the present invention, any of various carbon materials including the above pitch-based carbon fiber is heated at specified temperature in the presence of a specified metal or a compound thereof to thereby obtain the surface graphitized carbon material.

The metal for use in the surface graphitization in the present invention is one having catalytic activity in the promotion of graphitization of the carbon material, which is, for example, nickel, cobalt, iron, or manganese. Of the mentioned metals, nickel is preferred from the viewpoint of availability and cost.

Metal compounds containing the above specified metals include, for example, metal acetylacetonates such as nickel acetylacetonate, cobalt acetylacetonate, and iron acetylacetonate, metal nitrates such as nickel nitrate, cobalt nitrate, and iron nitrate, metal chlorides such as nickel chloride, cobalt chloride, and iron chloride and hydrates thereof. These may be used either individually or in combination.

In the process of the present invention, this metal or metal compound is contacted with the carbon material prior to the heat treatment together with the carbon material so that the metal or metal compound is caused to be present on the surface part of the carbon material.

It is preferred that the metal compound be caused to be present in the surface of the carbon material by dissolving the metal compound in a solvent to thereby obtain a metal compound solution, dispersing the carbon material in the solution and removing the solvent to thereby effect uniform adsorption or adherence of the metal compound to the surface of the carbon material, because uniform contact of the catalyst with the surface of the carbon material can be realized.

A suitable solvent is selected from among those which do not dissolve the carbon material and are inert to the carbon material, depending on the type of the employed metal compound. The solvent is preferably one which has a relatively low boiling point and which can be easily removed from the carbon material made to be surface-coated with the solution. Examples of suitable solvents include water and organic solvents, e.g., ketones such as acetone, methyl ethyl ketone, methyl propyl ketone, butyl methyl ketone, and isopropyl methyl ketone, alcohols such as ethanol, propanol, isopropanol, butanol, and isobutanol, hydrocarbons such as hexane, heptane, isooctane, cyclohexane, and methylcyclohexane, and ethers such as tetrahydrofuran.

On the other hand, a powdery metal or metal compound as a catalyst can directly be mixed with the carbon material prior to use. However, it is difficult to attain a uniform contact of the powdery catalyst with the carbon material, thereby inviting the danger of disenabling obtaining catalytic effect which is uniform throughout the surface of the carbon material. When superfine particles of metal are employed in an attempt to attain uniform contact between the metal and the carbon material, the superfine particles of metal exhibit strong cohesion, so that uniform dispersion and mixing become difficult with the result that not only, contrarily, uniform contact cannot be realized but also there is the danger that a fire occurs due to the surface activity of powdery metal.

In consideration of an average particle size (10 to 50 $\mu$m) preferred for use in a lithium-ion secondary battery, it is preferred that the above metal or metal compound be added in an amount of 1 to 30 parts by weight, especially, 3 to 20 parts by weight in terms of metal weight per 100 parts by weight of the carbon material, although the amount of the metal or metal compound may be changed depending on the particle size of treated carbon material.

When the amount of added metal or metal compound is less than 1 part by weight, the surface of the carbon material cannot satisfactorily be coated with the metal or metal compound, thereby inviting the danger that any satisfactory catalytic effect cannot be exerted. On the other hand, when the amount of added metal or metal compound exceeds 30 parts by weight, the production cost unfavorably increases while the catalytic effect remains unchanged.

In the surface graphitization according to the present invention, the carbon material having a metal or metal compound present on its surface as described above is heated at 300 to 1500° C., preferably, 500 to 1200° C., in an inert atmosphere thereby producing the surface graphitized carbon material.

In this surface graphitization, the metal or reduced metal from metal compound which is present on the surface of the carbon material exerts catalytic activity on the surface of the carbon material, so that the graphitization of the surface part of the carbon material is promoted. When the heating is conducted at below 300° C., the heating period is prolonged and satisfactory graphitization cannot be realized, so that desired charge and discharge cycle characteristics cannot be attained. Especially, in the use of the metal compound, the metal reduction rate is lowered to thereby intensify the above trend. On the other hand, when the heating temperature exceeds 1500° C., not only is the treatment cost increased but also the graphitization advances to such an extent that the internal part is also highly graphitized, thereby inviting a decrease of charge and discharge capacities.

The resultant surface graphitized carbon material contains employed metal or reduced metal from metal compound, which does not contribute to battery capacity and unfavorably increases the weight of negative electrode. Therefore, when the amount of added metal compound is large, it is preferred that the metal compound or reduced metal be removed by after-treatment.

The above metal removal can be carried out, for example, by immersing the obtained surface graphitized carbon material in an aqueous solution of an acid capable of dissolving the metal, e.g., an inorganic acid such as dilute hydrochloric acid or dilute nitric acid to thereby leach the metal.

The negative electrode of the present invention comprises the surface graphitized carbon material of the present invention which can be prepared by the above process and can be produced by the customary procedure. The negative electrode of the present invention may be provided with a current collector composed of a plate or foil of a metal such as copper or nickel.

This negative electrode can be produced by, for example, either of the following methods consisting of:

(1) method in which the surface graphitized carbon material is mixed with an appropriate amount of binder such as polyethylene, polytetrafluoroethylene, or polyvinylidene fluoride, shaped by a press roller into a sheet of about 10 to 100 $\mu$m in thickness and applied under pressure to one side or both sides of a foil of a metal such as copper or nickel having a thickness of about 10 to 50 $\mu$m, thereby obtaining a sheet of about 50 to 200 $\mu$m in thickness; and (2) method in which the surface graphitized carbon material is mixed with an appropriate amount of binder such as polyethylene, polytetrafluoroethylene, or polyvinylidene fluoride, slurried with the use of an organic solvent or an aqueous solvent, applied to one side or both sides of the above metal foil and dried, thereby obtaining a sheet of about 50 to 200 $\mu$m in thickness.

The negative electrode of the present invention can appropriately be assembled with common solid electrolyte or electrolytic solution and common positive electrode into the lithium-ion secondary battery.

With respect to the electrolytic solution, preferred use is made of an organic electrolytic solution comprising an aprotic organic solvent of high permittivity and, dissolved therein, an electrolyte. This organic solvent includes, for example, propylene carbonate, ethylene carbonate, tetrahydrofuran, 2-methyltetrahydrofuran, dioxolane, 4-methyldioxolane, acetonitrile, dimethyl carbonate, methyl ethyl carbonate, and diethyl carbonate. These solvents may be used either individually or in appropriate combination.

With respect to the electrolyte, preferred use is made of lithium salts capable of forming stable anions, such as lithium perchlorate, lithium borofluoride, lithium hexachloroantimonate, lithium hexafluoroantimonate, and lithium hexafluorophosphate. These electrolytes may be used either individually or in appropriate combination.

Various materials can be used for composing the positive electrode of the lithium-ion secondary battery, which include, for example, metal oxides such as chromium oxide, titanium oxide, cobalt oxide, and vanadium pentoxide; and lithium metal oxides such as lithium manganese oxide ($LiMn_2O_4$), lithium cobalt oxide ($LiCoO_2$) and lithium nickel oxide ($LiNiO_2$).

A separator is generally interposed between the above positive and negative electrodes, in which the separator is comprised of a nonwoven or woven fabric of synthetic or glass fibers, a polyolefinic porous membrane, a nonwoven fabric of polytetrafluoroethylene, or the like.

The above specified negative electrode of the surface graphitized carbon material according to the present invention can be assembled with other battery constituting elements such as the positive electrode, the electrolyte, the separator, the current collector, a gasket, a sealing plate and a casing into a cylindrical, rectangular, or button-shaped lithium-ion secondary battery according to the customary procedure.

For easy evaluation of the battery performance without the need to assemble a battery, however, the negative electrode of the invention can be assembled with a positive electrode of metallic lithium and a reference electrode of metallic lithium into a triode cell.

EFFECT OF THE INVENTION

The surface graphitized carbon material of the present invention comprises a graphitic surface and a carbonaceous internal part and therefore, when used in a negative electrode for lithium-ion secondary battery, simultaneously has the properties of the carbon material such that the charge and discharge capacities are large, excellent low temperature performance is ensured, and residual capacity can be displayed and the properties of the graphite material such that the cycle deterioration of charge and discharge capacities is slight.

The process for producing a surface graphitized carbon material according to the present invention comprises graphitizing the surface of a carbon material at 300 to 1500° C. in the presence of a metal including a metal having catalytically graphitizing activity or a metal compound thereof, so that the surface of the carbon material is preferentially graphitized. Therefore, the surface graphitized carbon material comprising a graphitic surface and a carbonaceous internal part can easily and efficiently be produced.

The negative electrode of the present invention, by virtue of the inclusion of the above surface graphitized carbon material, can provide a lithium-ion secondary battery which has large charge and discharge capacities and excellent properties at low temperature, enables display of a residual capacity and exhibits reduced cycle deterioration of charge and discharge capacities.

EXAMPLES

The present invention will further be illustrated below with reference to the following Examples and Comparative Examples, which in no way limit the scope of the invention.

Example 1

Mesophase pitch as a starting material was melt spun according to the common technique, thereby obtaining pitch fiber felt. The pitch fiber felt was infusibilized and thereafter carbonized at 650° C. to obtain a carbon fiber felt having a unit weight of 400 g/m$^2$.

This carbon fiber felt was pulverized by means of a jet mill, thereby obtaining milled carbon fibers (D) having an average particle size of 17.3 μm and an aspect ratio of 2.3.

0.50 g of nickel (II) acetylacetonate dihydrate (Ni $(C_5H_7O_2)_2 2H_2O$) was dissolved in 200 g of methyl ethyl ketone. 2.00 g of milled carbon fibers (D) were added to the obtained solution and agitated. The milled carbon fibers (D) were separated from the solution and dried to thereby remove the solvent therefrom. Thus, there was obtained a mixture of 100 parts by weight of milled carbon fibers (D) containing 5 parts by weight in terms of nickel weight of nickel (II) acetylacetonate.

This mixture was heated at 1000° C. for 10 hr in a nitrogen atmosphere, and nickel was leached therefrom with the use of a 5% aqueous hydrochloric acid solution. Thus, there were obtained milled surface graphitized carbon fibers.

The degree of graphitization of the surface of the resultant milled surface graphitized carbon fibers was measured by laser Raman spectroscopy using Ar ion laser (wavelength: 514.5 nm) as a light source. The ratio ($I_{1480}/I_{1600}$) of the intensity $I_{1480}$ of trough near 1480 cm$^{-1}$ to the intensity $I_{1600}$ of Raman band near 1600 cm$^{-1}$ ($I_{1480}/I_{1600}$) is listed in Table 1.

The milled surface graphitized carbon fibers were subjected to the X-ray diffractometry. The interlayer spacing led from the X-ray diffraction is listed in Table 1.

3% of PTFE (polytetrafluoroethylene) was added to the obtained milled surface graphitized carbon fibers and sheeted by means of a press roll. The resultant sheet was bonded under pressure to a nickel mesh, thereby obtaining a negative electrode. This negative electrode was assembled with a positive electrode and a reference electrode both composed of metallic lithium foils into a triode cell, by which an evaluation of the negative electrode was conducted.

The electrolytic solution of the triode cell was prepared by dissolving 1M of lithium perchlorate as an electrolyte in a ratio of 1/1 by volume mixed solvent of ethylene carbonate (EC) and dimethyl carbonate (DMC).

In the measurement of charge and discharge characteristics, 10 cycles of charge at a constant current of 100 mA/g and a constant voltage of 0.01 V and discharge at a constant current of 100 mA/g were carried out within the potential range of 0 to 2 V (vs. Li/Li+).

The obtained results are given in Table 1.

Example 2

2.00 g of nickel (II) acetylacetonate dihydrate (Ni $(C_5H_7O_2)_2 2H_2O$) was dissolved in 200 g of methyl ethyl ketone. 2.00 g of milled carbon fibers (D) prepared in the same manner as in Example 1 were added to the obtained solution and agitated. The milled carbon fibers (D) were separated from the solution and dried to thereby remove the solvent therefrom. Thus, there was obtained a mixture of 100 parts by weight of milled carbon fibers (D) containing 20 parts by weight in terms of nickel weight of nickel (II) acetylacetonate.

Milled surface graphitized carbon fibers were prepared in the same manner as in Example 1, except that use was made of the above mixture.

The Raman band intensity ratio ($I_{1480}/I_{1600}$) and the interlayer spacing led from X-ray diffraction of the milled surface graphitized carbon fibers were determined in the same manner as in Example 1. Further, a negative electrode was prepared and an evaluation thereof was conducted in the same manner as in Example 1.

The obtained results are given in Table 1.

Example 3

Mesophase pitch as a starting material was melt spun according to the common technique, thereby obtaining pitch fiber felt. The pitch fiber felt was infusibilized and thereafter carbonized at 750° C., to obtain a carbon fiber felt having a unit weight of 420 g/m$^2$.

This carbon fiber felt was pulverized by means of a jet mill, thereby obtaining milled carbon fibers (E) having an average particle size of 16.5 μm and an aspect ratio of 2.1.

0.99 g of nickel (II) nitrate hexahydrate (Ni$(NO_3)_2 6H_2O$) was dissolved in 200 g of ethanol 2.00 g of milled carbon fibers (E) were added to the obtained solution and agitated. The milled carbon fibers (E) were separated from the solution and dried to thereby remove the solvent therefrom. Thus, there was obtained a mixture of 100 parts by weight of milled carbon fibers (E) containing 10 parts by weight in terms of nickel weight of nickel (II) nitrate.

Milled surface graphitized carbon fibers were prepared in the same manner as in Example 1, except that use was made of the above mixture.

The Raman band intensity ratio ($I_{1480}/I_{1600}$) and the interlayer spacing led from X-ray diffraction of the milled surface graphitized carbon fibers were determined in the same manner as in Example 1. Further, a negative electrode was prepared and an evaluation thereof was conducted in the same manner as in Example 1.

The obtained results are given in Table 1.

Example 4

1.00 g of nickel (II) acetylacetonate dihydrate (Ni $(C_5H_7O_2)_2 2H_2O$) was dissolved in 200 g of methyl ethyl ketone. 2.00 g of milled carbon fibers (D) prepared in the same manner as in Example 1 were added to the obtained solution and agitated. The milled carbon fibers (D) were separated from the solution and dried to thereby remove the solvent therefrom. Thus, there was obtained a mixture of 100 parts by weight of milled carbon fibers (D) containing 5 parts by weight in terms of nickel weight of nickel (II) acetylacetonate.

This mixture was heated at 700° C. for 10 hr in a nitrogen atmosphere, and nickel was leached therefrom with the use of a 5% aqueous hydrochloric acid solution. Thus, there were obtained milled surface graphitized carbon fibers.

The Raman band intensity ratio ($I_{1480}/I_{1600}$) and the interlayer spacing led from X-ray diffraction of the milled surface graphitized carbon fibers were determined in the same manner as in Example 1. Further, a negative electrode was prepared and an evaluation thereof was conducted in the same manner as in Example 1.

The obtained results are given in Table 1.

Example 5

0.22 g of cobalt (II) chloride ($CoCl_2$) was dissolved in 200 g of ethanol. 2.00 g of milled carbon fibers (D) prepared in the same manner as in Example 1 were added to the obtained solution and agitated. The milled carbon fibers (D) were separated from the solution and dried to thereby remove the solvent therefrom. Thus, there was obtained a mixture of 100 parts by weight of milled carbon fibers (D) containing 5 parts by weight in terms of cobalt weight of cobalt (II) chloride.

Milled surface graphitized carbon fibers were prepared in the same manner as in Example 4, except that use was made of the above mixture.

The Raman band intensity ratio ($T_{1480}/I1_{1600}$) and the interlayer spacing led from X-ray diffraction of the milled surface graphitized carbon fibers were determined in the same manner as in Example 1. Further, a negative electrode was prepared and an evaluation thereof was conducted in the same manner as in Example 1.

The obtained results are given in Table 1.

Example 6

1.21 g of cobalt (II) acetylacetonate dihydrate (Co $(C_5H_7O_2)_2 2H_2O$) was dissolved in 200 g of methyl ethyl ketone. 2.00 g of milled carbon fibers (D) prepared in the same manner as in Example 1 were added to the obtained solution and agitated. The milled carbon fibers (D) were separated from the solution and dried to thereby remove the solvent therefrom. Thus, there was obtained a mixture of 100 parts by weight of milled carbon fibers (D) containing 10 parts by weight in terms of cobalt weight of cobalt (II) acetylacetonate.

Milled surface graphitized carbon fibers were prepared in the same manner as in Example 4, except that use was made of the above mixture.

The Raman band intensity ratio ($I_{1480}/I_{1600}$) and the interlayer spacing led from X-ray diffraction of the milled surface graphitized carbon fibers were determined in the same manner as in Example 1. Further, a negative electrode was prepared and an evaluation thereof was conducted in the same manner as in Example 1.

The obtained results are given in Table 1.

Comparative Example 1

Milled carbon fibers (D) were directly heated at 1200° C. for 10 hr in a nitrogen atmosphere, thereby obtaining milled carbon fibers (A').

The Raman band intensity ratio ($I_{1480}/I_{1600}$) and the interlayer spacing led from X-ray diffraction of the milled carbon fibers were determined in the same manner as in Example 1. Further, a negative electrode was prepared and an evaluation thereof was conducted in the same manner as in Example 1.

The obtained results are given in Table 1.

Comparative Example 2

Milled carbon fibers (D) were directly heated at 1000° C. for 10 hr in a nitrogen atmosphere, thereby obtaining milled carbon fibers (A').

The Raman band intensity ratio ($I_{1480}/I_{1600}$) and the interlayer spacing led from X-ray diffraction of the milled carbon fibers were determined in the same manner as in Example 1. Further, a negative electrode was prepared and an evaluation thereof was conducted in the same manner as in Example 1.

The obtained results are given in Table 1.

Comparative Example 3

Milled carbon fibers (D) were directly heated at 700° C. for 10 hr in a nitrogen atmosphere, thereby obtaining milled carbon fibers (A').

The Raman band intensity ratio ($I_{1480}/I_{1600}$) and the interlayer spacing led from X-ray diffraction of the milled carbon fibers were determined in the same manner as in Example 1. Further, a negative electrode was prepared and an evaluation thereof was conducted in the same manner as in Example 1.

The obtained results are given in Table 1.

Comparative Example 4

Milled carbon fibers (E) were directly heated at 1000°C. for 10 hr in a nitrogen atmosphere, thereby obtaining milled carbon fibers (A').

The Raman band intensity ratio ($I_{1480}/I_{1600}$) and the interlayer spacing led from X-ray diffraction of the milled carbon fibers were determined in the same manner as in Example 1. Further, a negative electrode was prepared and an evaluation thereof was conducted in the same manner as in Example 1.

The obtained results are given in Table 1.

Comparative Example 5

Milled carbon fibers (E) were directly heated at 700° C. for 10 hr in a nitrogen atmosphere, thereby obtaining milled carbon fibers (A').

The Raman band intensity ratio ($I_{1480}/I_{1600}$) and the interlayer spacing led from X-ray diffraction of the milled carbon fibers were determined in the same manner as in Example 1. Further, a negative electrode was prepared and an evaluation thereof was conducted in the same manner as in Example 1.

The obtained results are given in Table 1.

TABLE 1

| | Discharge capacity (mAh/g) | | Raman spectrum intensity | Interlayer spacing led from X-ray diffraction |
|---|---|---|---|---|
| | at 1st cycle | at 10th cycle | ratio ($I_{1480}/I_{1600}$) | (Å) |
| Ex. 1 | 292 | 289 | 0.39 | 3.503 |
| Ex. 2 | 288 | 288 | 0.34 | 3.498 |
| Ex. 3 | 274 | 274 | 0.40 | 3.501 |
| Ex. 4 | 371 | 369 | 0.40 | 3.613 |
| Ex. 5 | 364 | 362 | 0.41 | 3.610 |
| Ex. 6 | 351 | 348 | 0.38 | 3.614 |
| Comp. | 241 | 95 | 0.51 | 3.469 |

TABLE 1-continued

|  | Discharge capacity (mAh/g) at 1st cycle | Discharge capacity (mAh/g) at 10th cycle | Raman spectrum intensity ratio ($I_{1480}/I_{1600}$) | Interlayer spacing led from X-ray diffraction (Å) |
|---|---|---|---|---|
| Ex. 1 |  |  |  |  |
| Comp. Ex. 2 | 269 | 70 | 0.55 | 3.500 |
| Comp. Ex. 3 | 354 | 41 | 0.61 | 3.610 |
| Comp. Ex. 4 | 265 | 90 | 0.54 | 3.497 |
| Comp. Ex. 5 | 344 | 55 | 0.59 | 3.611 |

As apparent from Table 1, with the use of the negative electrodes of Comparative Examples 1 to 5 prepared from the milled carbon fibers (A') obtained by heating the milled carbon fibers (D), (E) in the absence of a metal compound containing a metal having catalytic activity, the discharge capacity at the 10th cycle is sharply decreased without exception although it is relatively large at the 1st cycle. On the other hand, with the use of the negative electrodes of Examples 1 to 6 prepared from the milled surface graphitized carbon fibers, the discharge capacity is relatively large at the 1st cycle and no significant decrease of discharge capacity is exhibited at the 10th cycle without exception, thereby demonstrating an improvement of cycle characteristics.

As also apparent from the Raman band intensity ratio ($I_{1480}/I_{1600}$) listed in Table 1, the graphitization of the surface part (having a thickness of about 2 μm) is more advanced in the milled surface graphitized carbon fibers of Examples 1 to 6 than in the milled carbon fibers of Comparative Examples 1 to 5. However, with respect to the inner part having a depth of greater than 2 μm from the surface to the center axis of the fiber, the Raman band intensity ratios ($I_{1480}/I_{1600}$) in Examples 1 to 6 were approximately the same as those of the milled carbon fibers of Comparative Examples 1 to 5 treated at the same carbonization temperatures and, therefore, the difference in the advance of graphitization cannot be observed between the inner part of the milled surface-graphitized carbon fibers and the conventional milled carbon fibers. From the result, it can be understood that the graphitization of the surface part having about 0.2 μm thickness is sufficient for obtaining the effects of the invention.

Moreover, the milled surface graphitized carbon fibers of Examples 1 to 6 and the milled carbon fibers of Comparative Examples 1 to 5 were subjected to X-ray diffractometry and the degree of graphitization through the entirety of the fiber was evaluated by the common technique. As a result, no significant difference was recognized in the degree of graphitization through the entirety of the fiber between the milled surface graphitized carbon fibers and the milled carbon fibers of Comparative Examples 1 to 5 when the heatings were conducted at the same temperatures.

What is claimed is:

1. A process for producing a surface graphitized carbon material, the process comprising carbonizing an organic material at 400 to 1500° C. to form a carbonized carbon material, contacting the carbonized carbon material with a metal having catalytically graphitizing activity or a compound thereof to thereby cause the metal or metal compound thereof to be present on a surface of the carbonized carbon material, and then heating the carbonized carbon material at 300 to 1500° C. in an inert atmosphere to thereby prepare a surface graphitized carbon material comprising a graphitic surface and a carbonaceous internal part, wherein, when Raman spectrum light intensities of the graphitic surface are measured by Ar ion laser (514.5 nm in wavelength) Raman spectroscopy, a ratio ($I_{1480}/I_{1600}$) of an intensity $I_{1480}$ of a trough appearing at 1480 cm$^{-1}$ and an intensity $I_{1600}$ of a peak appearing at 1600 cm$^{-1}$ is 0.45 or less, and an interlayer spacing of graphite layers in the surface graphitized carbon material is not less than 3.460 Å.

2. The process as claimed in claim 1, further comprising carbonizing a pitch fiber, and milling the carbonized pitch fiber to form the carbonized carbon material.

3. The process as claimed in claim 1, wherein the metal is selected from a group consisting of nickel, cobalt, iron and manganese.

4. The process as claimed in claim 3, wherein the metal compound is selected from a group consisting of metal acetylacetonates, metal nitrates, metal chlorides and hydrates thereof.

5. A process for producing a surface graphitized carbon material, the process comprising carbonizing an organic material at 400 to 1500° C. to form a carbonized carbon material, dissolving a metal compound comprising a metal in a solvent to obtain a metal compound solution, dispersing the carbonized carbon material in the metal compound solution, removing the solvent from the metal compound solution to form a carbonized carbon material with the metal on a surface thereof, and heating the carbonized carbon material with the metal on the surface thereof at 300 to 1500° C. in an inert atmosphere to thereby prepare a surface graphitized carbon material comprising a graphitic surface and a carbonaceous internal part.

6. The process as claimed in claim 5, wherein the metal is selected from a group consisting of nickel, cobalt, iron and manganese.

7. The process as claimed in claim 6, wherein the metal compound is selected from a group consisting of metal acetylacetonates, metal nitrates, metal chlorides and hydrates thereof.

* * * * *